(12) United States Patent
Kiezel (10) Patent No.: US 7,762,749 B2
(45) Date of Patent: Jul. 27, 2010

(54) SINGLE BORE SELF-CENTERING JIG

(76) Inventor: George Kiezel, 3216 Norstrom Way, Sacramento, CA (US) 95833

( * ) Notice: Subject to any disclaimer, the term of this patent is extended or adjusted under 35 U.S.C. 154(b) by 319 days.

(21) Appl. No.: 12/151,990

(22) Filed: May 12, 2008

(65) Prior Publication Data

US 2009/0279968 A1 Nov. 12, 2009

(51) Int. Cl.
*B23B 47/28* (2006.01)
(52) U.S. Cl. .................................. 408/115 R; 408/103
(58) Field of Classification Search .............. 408/72 R, 408/97, 103, 108, 115 R, 109, 241 G
See application file for complete search history.

(56) References Cited

U.S. PATENT DOCUMENTS 2,783,665 A * 3/1957 Saunders ..................... 408/108
2,810,310 A * 10/1957 Saunders ..................... 408/109
3,674,376 A * 7/1972 Silken ....................... 408/115 R
3,807,889 A * 4/1974 Kiezel ......................... 408/108
4,884,926 A * 12/1989 Gibson ..................... 408/115 R
5,051,042 A * 9/1991 Gibson ....................... 408/72 R

* cited by examiner

*Primary Examiner*—Daniel W Howell
(74) *Attorney, Agent, or Firm*—Mark C. Jacobs (57) ABSTRACT

A device to aid the user to drill a hole in the exact transverse center of an elongated object, such as the edge of a board to be joined by dowels. It has a single pivoted cross which expands and contracts in response to movement of a pair of spaced parallel channels that contain the cross. Channel movement is controlled by a clamp screw acting in conjunction with spring means urging the channels apart. The ends of the arms of the cross carry locator pins equidistantly spaced from the pivot axis, so that as the locator pins snugly retain both sides of the object to be drilled, the pivot axis is automatically centered.

15 Claims, 7 Drawing Sheets

SINGLE BORE SELF-CENTERING JIG

FIELD OF THE INVENTION

This invention relates to a small device for drilling holes in the edges of boards to be joined by dowels, as well as pipes and other items to be joined, which require boring.

KNOWN PRIOR ART

Applicant is the owner of U.S. Pat. No. 3,807,889, issued Apr. 30, 1974, which was based upon an earlier application, Ser. No. 253,476, filed in the name of George L. Kiezel, now abandoned.

BACKGROUND OF THE INVENTION

In my previous U.S. Pat. No. 3,807,899, I described a device having a pair of spaced cross arms that rode in upper channels and which had coincident bores within each arm for aligning holes to be drilled. I have now invented a related but simplified device that also uses the concept of a cross arm riding in spaced channels for self-centering upon the edge of a board for the locus of a hole to be drilled.

Whereas my patented device has two cross arms, this device has only one cross arm. Just as the previous unit used a single tightening screw and self-locating pins, so too does this invention.

While my previous device worked well, the complexity of it and the high cost of manufacture kept it from being a big seller. In the interim, however, no other, better, device has reached the marketplace, though there have been developments to be found in the patent literature.

BRIEF SUMMARY OF THE INVENTION

A device for marking board edges, pipes, rods, and bars, for holes to be bored in such parallel-sided objects. The device includes a crossed arm whose four edges ride in a pair of spaced mirror image U-shaped channels. The movement of the two arms is controlled by and limited by the spacing of channels. The channel spacing is operated by a clamp screw having a coil spring thereon to urge the channels apart. Coincident to the axis of the cross arm is a bore that can receive a marker of a drill bit. Means are provided for retention of a measurement bar to permit the user to make a series of linearly aligned bores or markings.

It is therefore, an object of the invention to provide a drilling jig which is automatically self-centering.

It is another object of the invention to provide a drilling jig which is economical, compact, and light in weight.

It is a third object of the invention to provide a rugged, reliable, easy to operate drilling jig.

It is a fourth object of the invention to provide a drilling jig which can be used with almost any elongated object having parallel sides, such as boards, pipes, bars, rods, channels, and the like, to be joined.

It is yet a fifth object of the invention to provide a drilling jig wherein marks or holes can be accurately located in spaced relation on a longitudinal median plane of the object.

It is still a sixth object of the invention to provide a drilling jig which can accept drill bits of different sizes.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature & objects of the invention, reference is made to the following detailed description, taken in conjunction with the accompanying drawings.

DESCRIPTION OF THE PREFERRED EMBODIMENT

Figure 1:
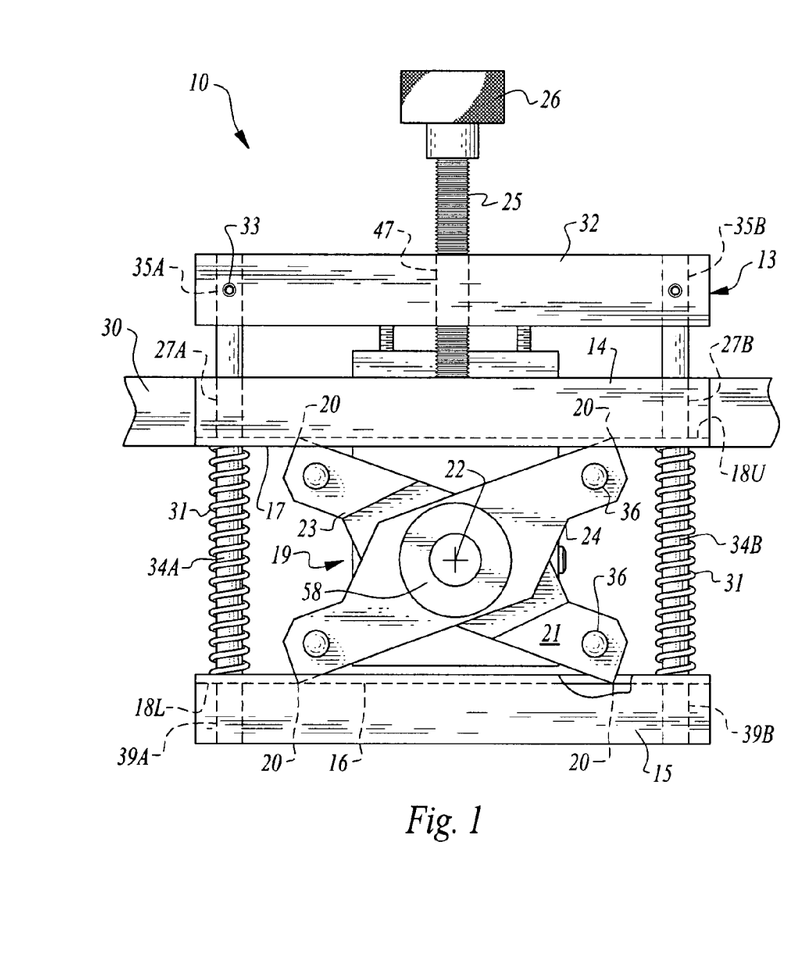
FIG. 1 is a rear elevated view of the device of this invention.

The reader's attention is first directed to FIG. 1. Here it is seen that the drilling jig of this invention comprises a frame, 13, which has a pair of spaced, parallel disposed, mirror image, opposed U-shaped channels; an upper channel, 14, and a lower channel, 15. The openings of each of the two Us, as noted, face each other, such that the upward and downward extending side walls of the respective U-channels, taken in conjunction with the planar base, 17, of each U-shaped member form a track; one of which is designated 18U for upper and 18L for lower. These tracks can be best seen in the side view, FIG. 5.

Figure 3:
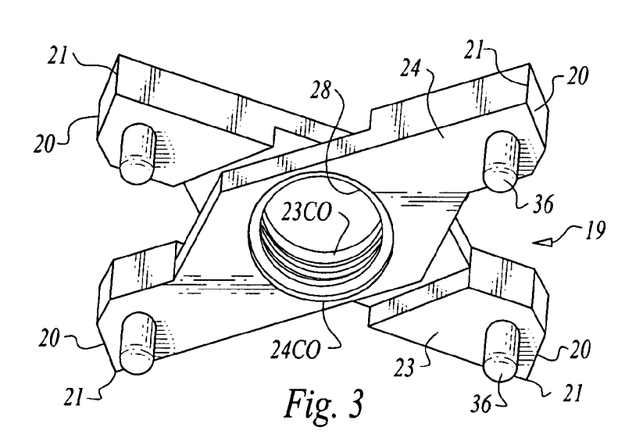
FIG. 3 is a closeup obverse view of one component of this invention.
Figure 4:
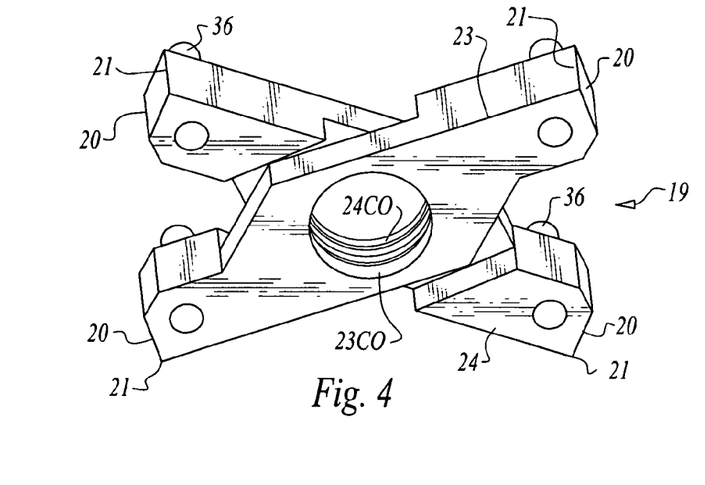
FIG. 4 is a closeup reverse side view of the same component.

A cross, 19, having two joined arms, 23 and 24, is seen in FIG. 1, and as a separate component for its obverse and reverse faces in FIGS. 3 and 4. Each arm has two ends, all of which are designated 20. At a terminus of each of the ends, 21, there is a shoe, formed at the right angled edge thereof. These arm ends, designated shoes, 20, constitute sliding surfaces that travel in the respective tracks, 18U and 18L, in both directions, dependent upon the direction of the turning of the tightening bolt, as discussed elsewhere herein. The two arms, 23 and 24, form an "X," and the two arms are pivoted on a central axis, 22, by nesting one within the other. Even though the shoes move, the cross itself remains stationary due to its scissor-like mounting of the arms.

The two arms, 23 and 24, each have a large central opening, 23CO and 24CO, that align when the two arms are overlaid to form the "X." See FIGS. 3 and 4. The two arms of the cross or "X," are actually two crossed levers that are symmetrically arranged. The two arms, 23 and 24, are pivotally connected for rotation about the pivot axis, 22, in the nature of a pair of scissors. The crossed arms are made with similar physically offset sections, in order to decrease the axial extent of the cross. Note center opening, 28, which receives the tubular guide, 58, which can vary in opening diameter to accommodate different size drill bits or pencils for marking the drilling location. Center opening, 28, is the whole opening created through the combination of 23CO and 24CO. A variable camera shutter opening guide could be employed to retain pencils and drill bits of differing diameters.

Figures 12, 13, 14:
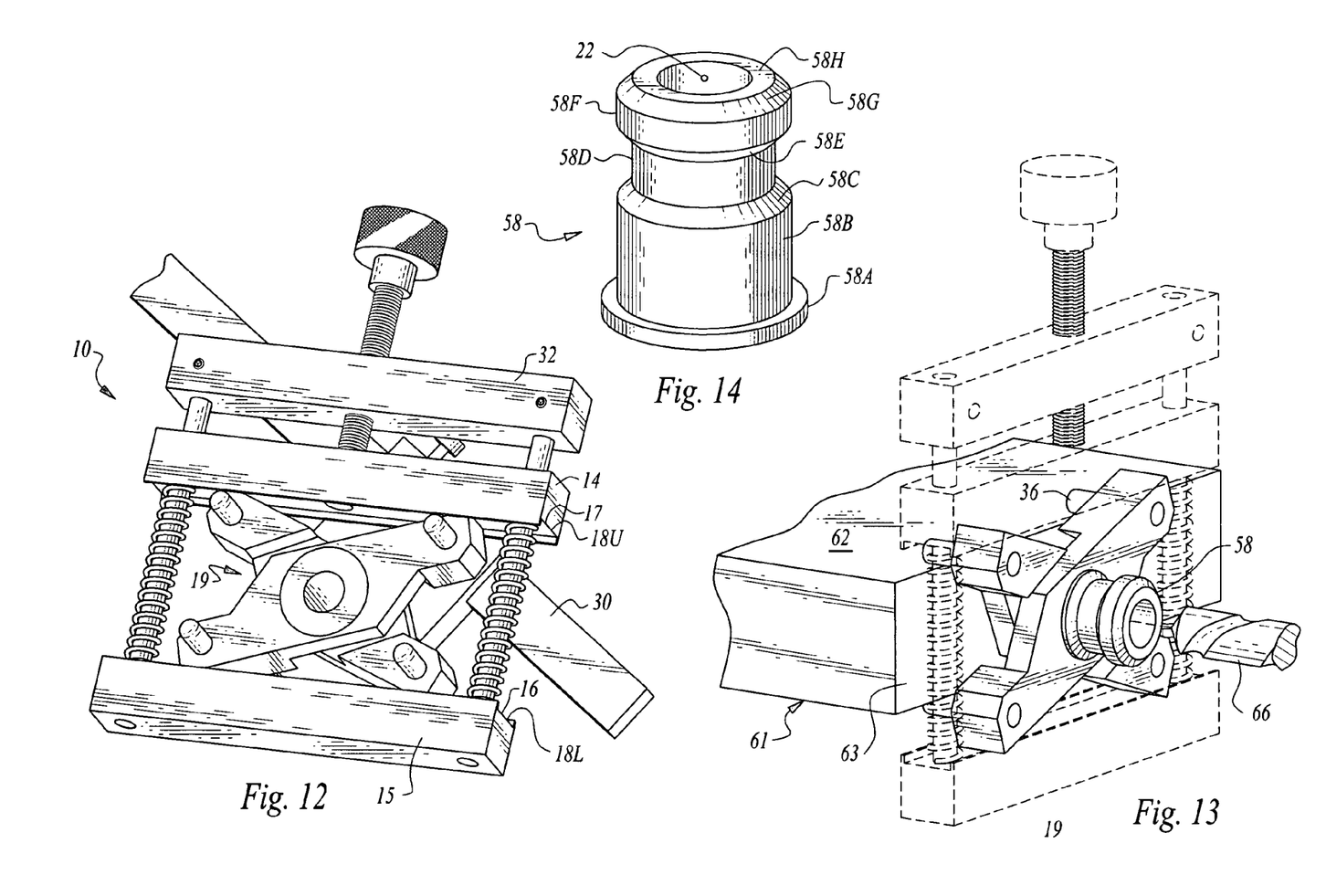
FIG. 12 is a perspective view of a measuring bar angle mounted.
FIG. 13 is a diagrammatic view showing the device attached to the end of an elongated board.
FIG. 14 is a side perspective view of the tubular guide.
Figure 15:
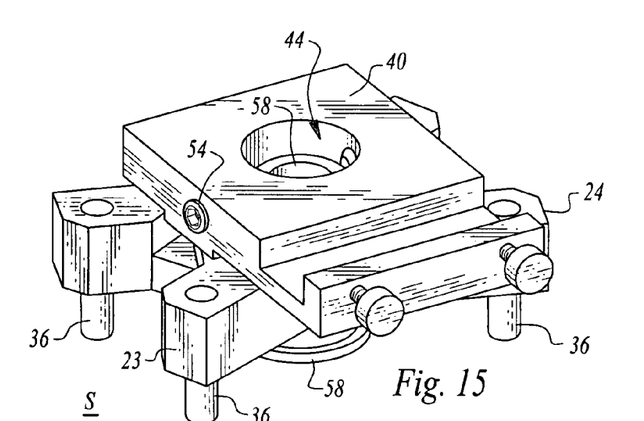
FIG. 15 is a top perspective view of the assemblage of the retainer, and the two cross arms, but with the tubular guide in correct position.
Figure 16:
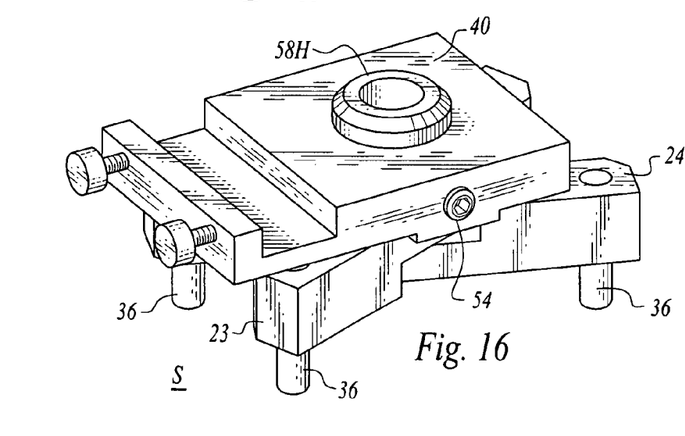
FIG. 16 is a top perspective view of the assemblage of the pieces of FIG. 15 with the tubular guide locked into position sticking forward of the retainer.
Figure 17:
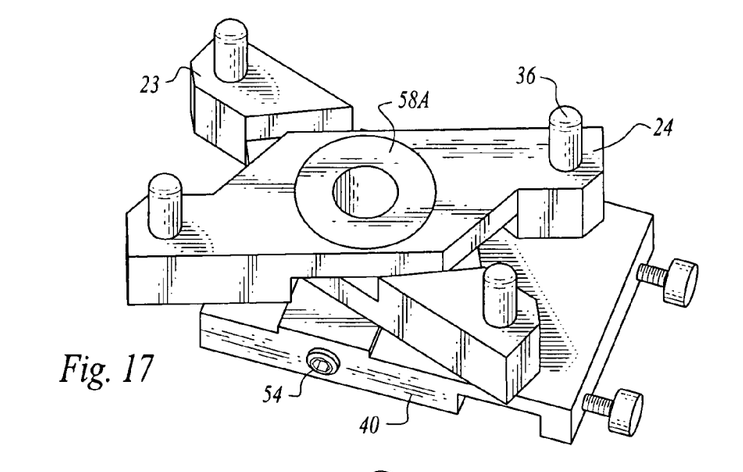
FIG. 17 is a bottom perspective view of the same assemblage.
Figure 18:
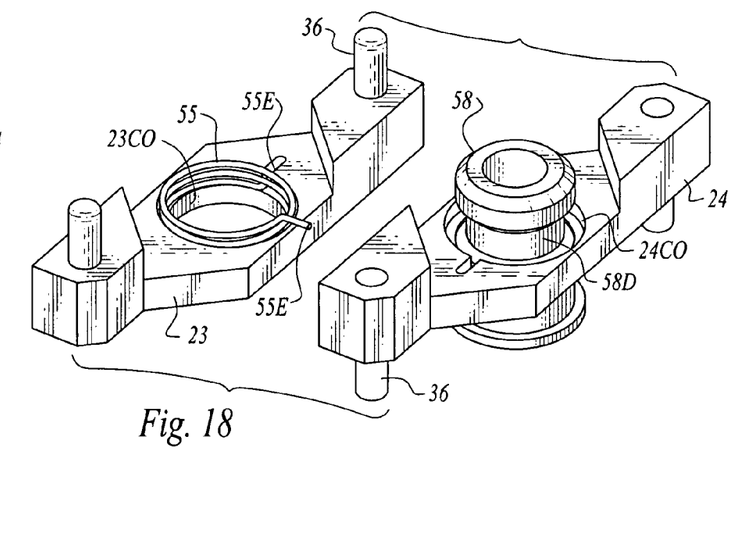
FIG. 18 shows the two cross arms disconnected with the tension spring disposed in one arm and the tubular guide not in position, but nested into the other arm.
Figure 19:
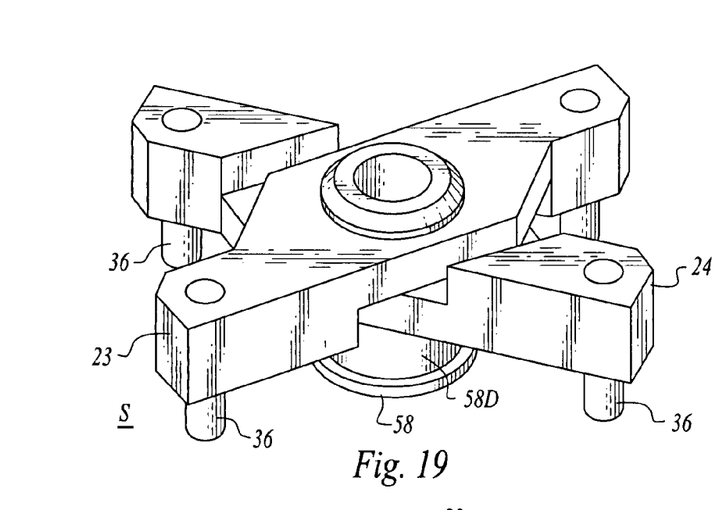
FIG. 19 shows the elements of FIG. 18, but the tubular guide is resting on the surface below the two arms.
Figure 20:
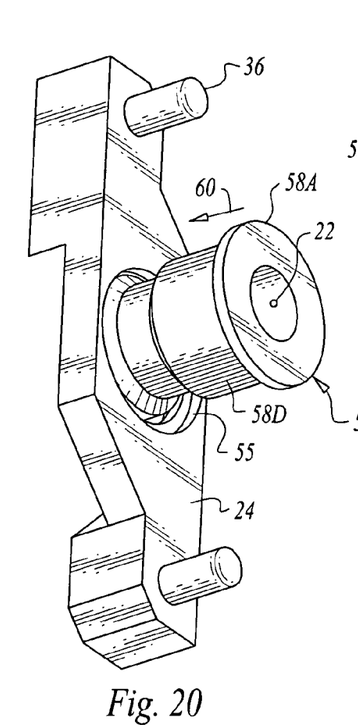
FIG. 20 is a side perspective view of one arm with the tubular guide disposed therein partially.
Figure 21:
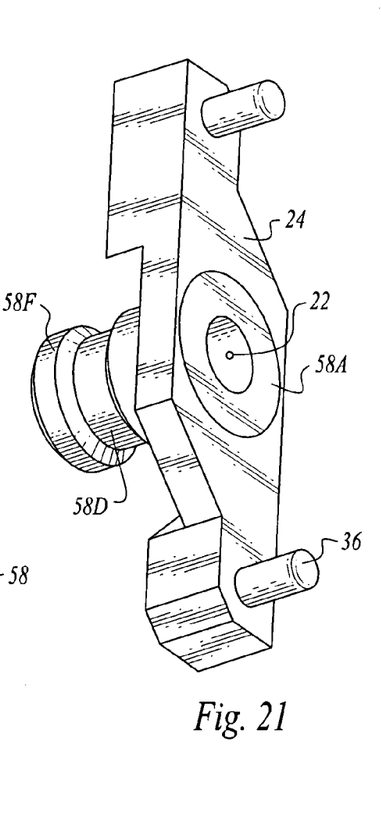
FIG. 21 is a view similar to FIG. 20 but with the tubular guide shown fully disposed with the lower arm.
Figure 22:
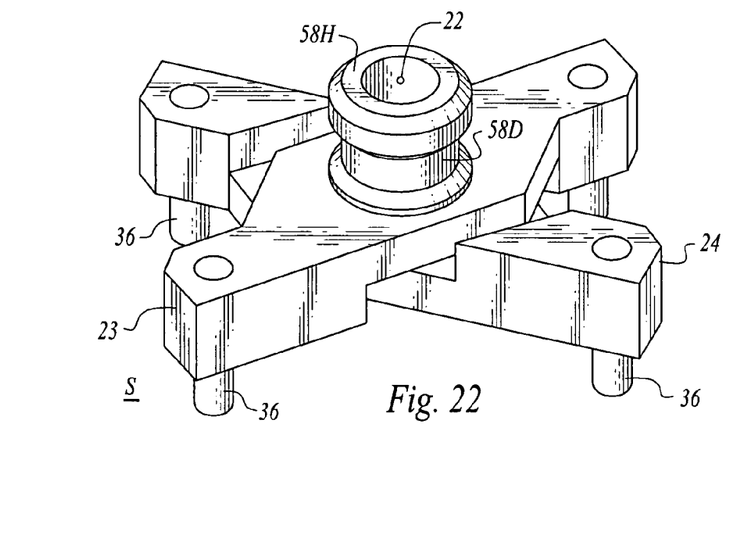
FIG. 22 is a top perspective view of the two arms, the spring and the tubular guide, with the guide fully in position.

Let us now turn our attention to the various components that form the sub-assembly shown in FIGS. 15 and 16. But first, reference is made to FIG. 14, element 58, the tubular guide. This inserted item is a generally elongated annular part that is depicted in FIG. 14. The tubular guide, 58, white inserted horizontally for use, is depicted vertically in FIG. 14, and will be discussed as if it were a vertically disposed member. Tubular guide, 58, has a lower ledge, 58A, that extends outwardly beyond the balance of the body which has a finite width. The largest body portion, vertically, is of a slightly narrower finite diameter. This terminates at a beveled inwardly edge 58C, which leads to a slightly recessed $4^{th}$ section, 58D, which is a second body section. Section 58D terminates at an outwardly beveled edge, 58E, which leads to a third smaller body section, 58F, of the same finite diameter as body section 58B. This third or upper body section, 58F, leads to an inwardly beveled larger segment, 58G, which terminates in a horizontal surface, 58H. The entire element has a bore there through, designated 22, the pivot axis. See FIG. 1.

The discussion now moves to FIG. 15. In this FIGURE, coil spring, 55, is seen to have two outward spaced ends, 55E. One of the ends, 55E, fits into the respective slot, 59, as shown by the indicator arrow, 60, prior to the time that the two arms, 21, are engaged with each other per FIG. 1, for example, or FIG. 3. As can be easily envisioned, the spring's coil, 55, fits into the recessed section, 58D, of the tubular guide prior to the engagement of the two arms, 21. When so placed, the combination of the recessed section with the spring overlaying it has a diameter substantially equal to the wider sections of the tubular guide, 58. Again refer to FIG. 14. Thus, when the guide is carrying the spring and the arms are in the process of being assembled to engage, as per FIG. 16, the spring on tubular guide fits snugly in the center opening, 28, of the two arms. See FIG. 4. Because of the positioning of the spring, and its two ends 58E, the spring will urge the arms, 21, apart when the pressure of the screw, 25, is relaxed, that is, turned counterclockwise.

A bar, 32, having a central threaded bore, 47, carries a tightening bolt, 25, having a knurled enlarged head, 26, for ease of use. When tightened screw, 25, serves to bear upon the top surface of channel, 14, thus moving it away from bar, 32. Bar, 32, has a pair of spaced upward extending bores, 35A and 35B, each of which receives one end of one of a pair of connecting rods, 34. Rods, 34, frictionally fit into bores, 35A and 35B, respectively. An Allen screw, 33, in a suitable threaded bore, impinges into a slight recess in said respective rods to retain the respective rods within the confines of the bores, 35A and 35B, of the bar, 32.

Upper channel, 14, has a pair of aligned throughbores, 27A and 27B, which are spaced in from the end of said channel, 14, to be aligned with bores, 35A and 35B. Rods 34A and 34B pass through throughbores, 27A and 27B. These rods have a hidden threaded end, not seen, that threads into a threaded bore, 39A, and a threaded bore, 39B, respectively, at opposite ends of the lower channel, 15, to be threadedly engaged. See FIG. 2, where these threaded bores may be seen in dashed lines.

One compression spring, 31, rides on each of the two connecting rods, 34A and 34B, each of which is threaded at the end and is interposed between the track bases of the upper and lower channels, in order to urge the two channels away from each other. Hand tightening the tightening bolt, 25, clockwise, overcomes the urging apart by the two compression springs. Thus, it is seen that as the bolt, 25, is tightened or loosened, (loosened=counterclockwise) the upper channel moves up or down relative to the lower channel, along the pair of spaced rods, 34A and 34B.

Movement of the upper channel, 14, downwardly causes shoes, 20, of the two upper arms, 21, and the two lower arms, 21, of each of the cross members, 23 and 24, to ride within the tracks previously described such that each the top locator pin, 36, disposed in an arm of one cross member moves away from the locator pin of the other cross member as the channel, 14, moves downwardly. The lower locator pins, also designated 36, move further apart in like manner, also due to the central pivot for both "X" members. When the upper channel, 14, moves away from the lower channel, the locator pins on the upper arms, 21, and the locator pins on the lower arms, 21, move inwardly toward each other.

This transpires because each of the pins, 36, is located adjacent to the end of its respective part of an arm, 23 and 24, all equally spaced distant from the pivot axis, 22, such that the pins move in mirror image symmetry relative to the pivot axis, 22, both laterally and vertically. The opposite motion of the upper versus the lower pins is the exact same. Thus, no matter the location of the four pins, 36, the pivot axis, 22, is always equally distant from all four pins.

The discussion now moves to FIG. 2, wherein the retainer, 40, which is not fully visible in FIG. 1, and which is used to hold the elongated measuring bar, 30, shown in FIG. 1 can be seen will now be discussed. This portion is also seen separated from the device in FIG. 7. Thus, FIG. 7 should be referenced simultaneously. Retainer, 40, has three sections that are integrated into one component. Thus, an upper section, 41, of about 0.75 inches in depth, is connected to a larger in elevation middle section, but which middle section is of a lesser depth of about 0.25 inches, with the recess being the forward area, which means that the rear edge of the section is aligned with the rear edge of the upper and bottom sections. See the side elevation in FIG. 5 for a fuller understanding thereof.

The bottom section, 43, is of the same depth as the upper section, but is of much greater elevation than the upper and middle sections combined. The bottom section has a central opening, 44, that aligns with the central openings of the two arms, 23 and 24. These three aligned openings; namely, 23CO and 24CO, and central opening, 44, of the retainer, receive the tubular guide, 58, seen in FIG. 1 as well as in FIG. 2.

It is also seen that the upper section, 41, has a pair of spaced threaded bores, 45, each of which receives a thumb screw, 46, in threaded engagement. These thumb screws, when tightened, exert pressure on the aforementioned measurement bar, 30, to keep it set in place within the channel formed by the combination of the upper and lower sections and the recess of the middle section. This is readily discernible form the side elevational view, FIG. 5.

Figure 5:
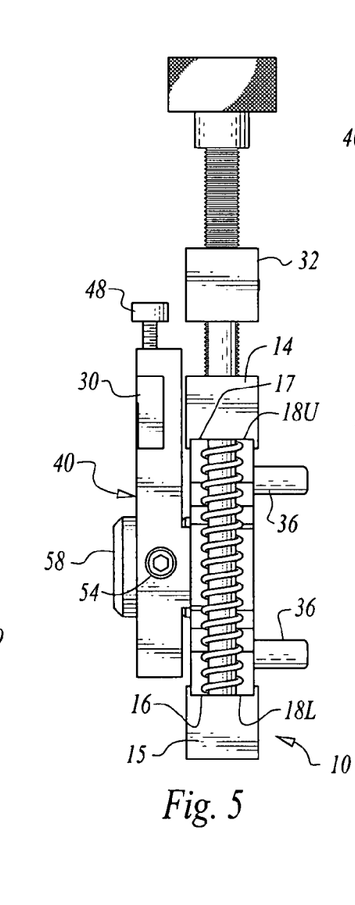
FIG. 5 is a left side perspective view of the device with a measuring bar shown in position within the device.
Figure 7:
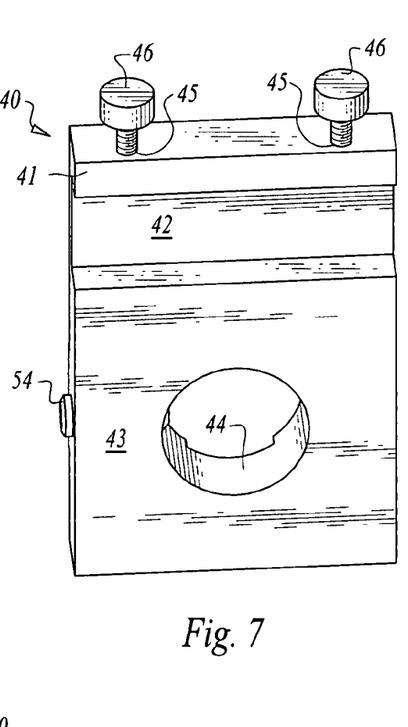
FIG. 7 is a second component; namely the space bar retainer used in this invention.

A bushing, 51, seen in FIGS. 5 and 7, is disposed in a suitable threaded bore of the sidewall of the bottom section on either the left or right surface. When tightened, it will serve to secure a pen or marking awl that is used to designate a location for a hole or other actions. Note the presence of the measuring bar, 30, within the channel formed by the upper middle and bottom sections of the retainer, 40.

Figure 2:
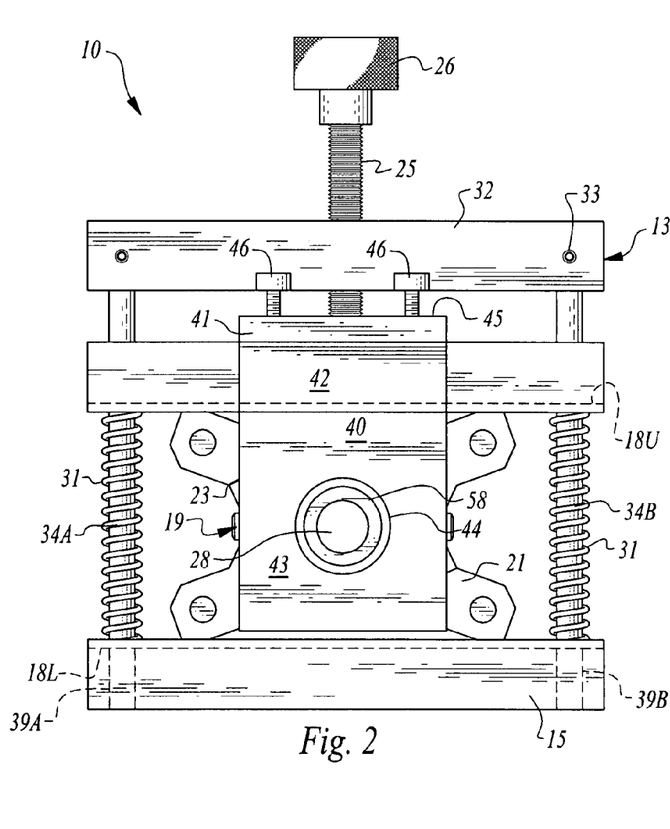
FIG. 2 is a front side elevated view thereof.

Mental reference should also contrast FIG. 1, the obverse side, and FIG. 2, the reverse side, as the shoes of the "X" members, 23 and 24, are located differently because the upper channel, 14, has been moved toward the lower channel, 15, in FIG. 2.

Figure 6:
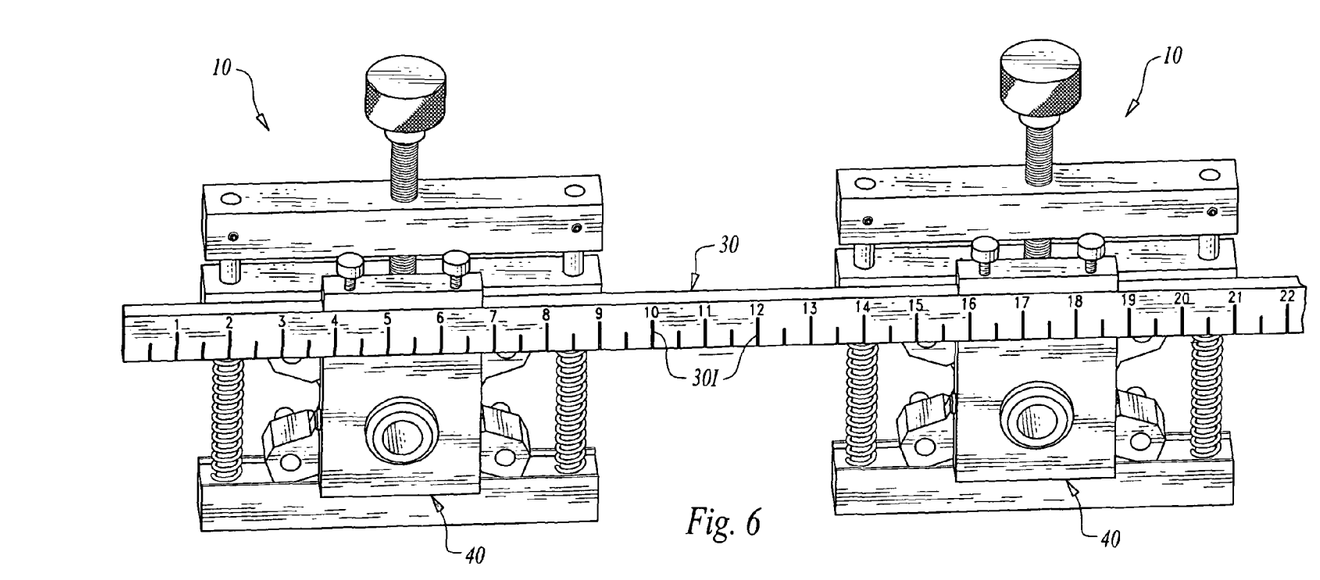
FIG. 6 is a top perspective view of two of the devices, spaced out, both being disposed on a measuring bar.

In FIG. 6, the measuring bar, 30, is seen to be held by two spaced units of this invention within their respective retainer. The indicia markings 30-I are set out in inches and half inches thereon.

FIG. 7 has been discussed supra.

Figure 8:
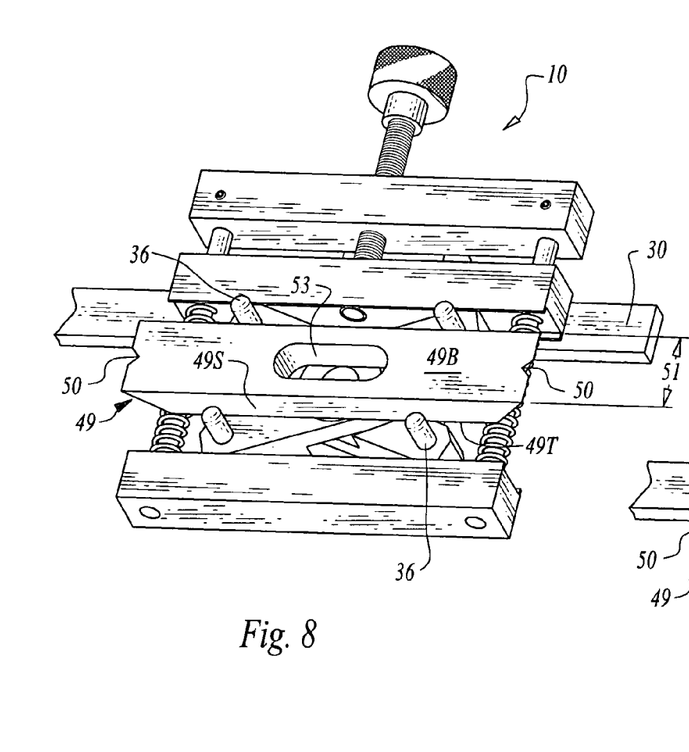
FIG. 8 is a bottom rear perspective view of the device, attached to a measuring bar, with a point setter disposed within the crossed arm.
Figure 9:
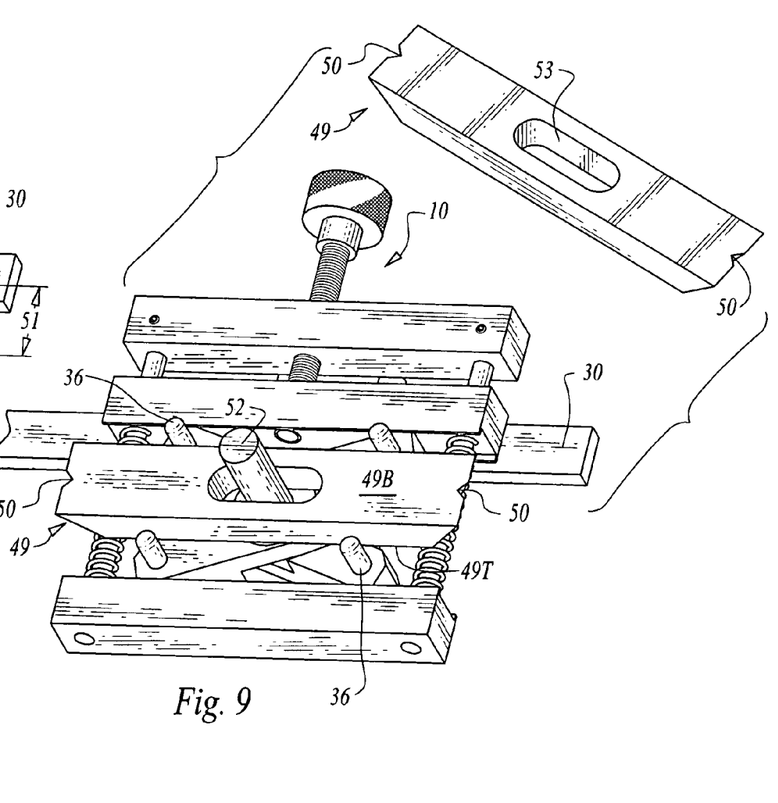
FIG. 9 is a view similar to FIG. 8, with a pointing pin in place in the device and with a second point setter adjacent thereto.
Figure 10:
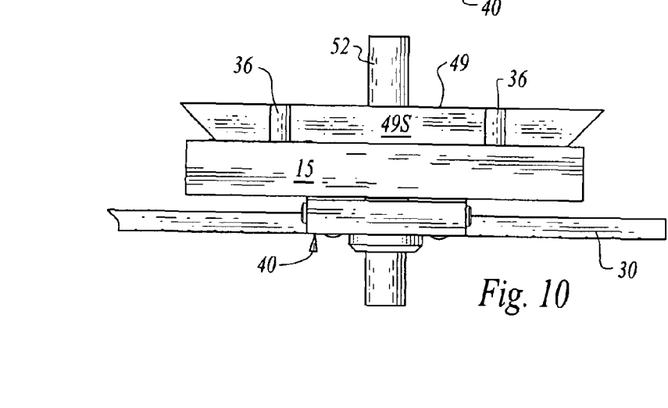
FIG. 10 is a bottom plan view of the device with a measuring bar and point setter.

FIGS. 8, 9 and 10 should be viewed together, as the discussion will pertain to the three of them simultaneously. FIG. 8 is a front perspective view, FIG. 9 is a bottom perspective view, and FIG. 10 is a bottom plan view, all of which depict one unit of the device, with a measuring bar seen from the rear within the confines of its retainer, and with a notch bar, 49, disposed between the four locator pins, 36, of the device, 10. Notch bar, 49, is of a trapezoidal shape with the base, 49B, standing for the bottom, being of greater extension than the base, 49T, the top base. The two sloping sides may vary between 30 and 45 degrees, as may be desired. A notch, 50, is disposed in the bottom base, midway between the two sides 49S. The notch bar is mounted within the locator pins, 36, with the smaller base adjacent to the device (FIG. 10).

In FIGS. 9 and 10, a center pin, 52, is seen disposed in the center opening of the two cross arms, and in an elongated racetrack channel, 53, located in the center of the notch bar with a horizontal disposition. The width of the notch bar designated 51, in FIG. 8, can vary, and conveniently can match lumber sizing for easy alignment. This is achieved by having the thickness, 51, of the device match the thickness of the lumber end, such as 1.75 or 0.75 inches. As can be seen in FIG. 9, the center pin is longer than any of the 4 locator pins of the cross arms of the "X" member, 23. Compare FIG. 8 to FIG. 9. The center pin, 52, is of a slightly narrower cross section than the opening of each cross member, 22, such as to provide a friction fit. As can be seen in FIG. 10, the center pin, 52, extends all the way through on the opposite side, that is, through the retainer as well.

After a first dowel bore is made through the central axis, 22, of the device into the end of a board, such as for forming part of a piece of furniture, a center pin, 52, is placed into center opening of the device and through the channel and into the new hole, subsequent to removal of the drill bit. This then permits the user to align the two equi-dimensional side edges with the edges of the board. A pen or pencil is then used to make two dots in the notches located in the middle of the notch bar. These 2 potential holes marked at opposite ends of the notch bar and the pre-existing hole in which the center pin is located, will now be fully aligned. By moving the center pin from hole to hole laterally, as new ones are drilled out, a large series of linearly aligned holes can be easily drilled.

Figure 11:
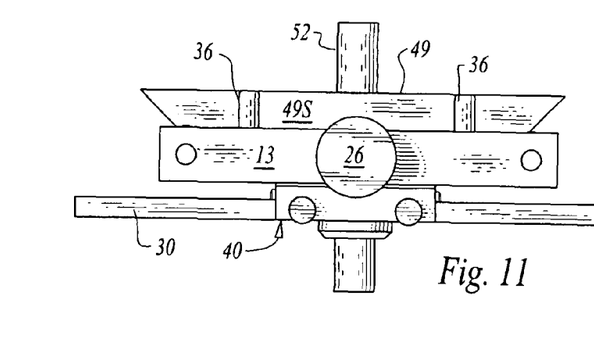
FIG. 11 is a top plan view of the device with a measuring bar and point setter.

FIG. 11 is a view similar to FIG. 10, but from a top orientation. Since all of its parts have been discussed, very little further need be said. The notch bar may be made of high impact plastic as well as of machined steel or aluminum. The center opening of the notch bar is a racetrack rather than being circular, and is dimensioned 7/16" by 3/4".

It is also to be seen that the notch bar need not be positioned parallel to the measuring bar. The notch bar can be rotated as may be desired not be reorienting the notch bar but by rotating the retainer relative to the horizontal axis of the device. The notch bar will always be parallel as it is held between the 4 locator pins, 36, but the retainer, 40, is held by tubular guide, 58, which is friction fit into place. See FIG. 12.

Operation

Because of its automatic centering capability, the jig of this invention can be used to mark or serve as a drilling template, to drill into the exact center of an elongated object such as a board, 90, along its ends. For a sliding door, this would be the top and bottom edges that often ride in a track, if the door is a sliding door. Thus, it is seen that by the tightening or loosening of the tightening bolt, the opposed pairs of locator pins, 36, hold onto the opposite sides, 52, of an elongated object such as a board, 51, as shown in FIG. 13. The edge, 53, can therefore be marked or drilled in the exact transverse center of the edge, 53. This is accomplished by putting the drill bit, 66, into the tubular guide, 58, which extends through both arms, 23 and 24, of the "X," and the retainer, 40, to impact and engage the exact center of the transverse edge, 63, of the board.

After the first hole is made, the notch bar is put into place, the center pin, 52, is inserted into the first hole drilled, then the next one or two holes are marked in the notches, 50, and the next adjacent holes can be drilled, after moving the jig to a location to align the drill bit with the marking(s) on the edge, 63, of the board.

This cycle is carried out as often as needed to drill the desired amount of holes. The process is then repeated on the unseen board to mate to the board, 61, just drilled, such that the two boards can be joined by a series of dowels, not seen. Because of the double symmetry of the two arms of the "X," the transverse center of the board edge, 63, is always located, no mater the thickness of the board, within the confines of the limits of the movement of the two arms, i.e. by the size of the device.

In order to accommodate different size drill bits, the interior diameter of the tubular guide, 58, is offered in increments while the remainder of the donut shaped guide remains the same such as to have the friction fit with the axis, 22.

It is seen therefore that I have provided a self-centering jig, which can be attached to a multiplicity of objects for both marking and drilling of holes or recesses. It is both low priced and easy to use.

Since certain changes may be made in the above device without departing from the scope of the invention herein involved, it is intended that all matter contained in the above description and shown in the accompanying drawings, shall be interpreted as illustrative only, and not in a limiting sense.

I claim:

1. A self centering drilling jig comprising:
    a) a frame having a pair of mirror image opposed U-shaped channels, an upper channel and a lower channel, which channels define a spaced pair of parallel tracks, and a bar spaced away from said upper arm;
    b) a single cross having two crossed arms, each arm having two ends, the respective ends of said crossed arms each sliding within the confines of one of the two channels, and movable along said channels between an inward position wherein the ends of one arm are closer to the ends of the other arm, and an outward position wherein the ends of the one arm are further apart from the ends of the other arm, the positioning of the two arms being dependent on the spacing between the two channels;
    c) a spring means connected to said cross to urge said cross into the outward position;
    d) threaded means disposed in said bar and impacting said upper channel for biasing said channels toward each other in opposition to said spring means, to thereby position the ends of said arms in a desired location;
    e) a single locator pin mounted near each end of each of said arms, and disposed outwardly from one side of said cross, each pin being equidistant from the center of said cross, and being adapted to retain the upper and lower faces of an elongated object to be drilled, between the four locator pins.

2. The device of claim 1 where in the bar is aligned with, and parallel to, each of said channels.

3. The device of claim 1 further including a pair of spring carrying rods connecting said bar and said lower channel.

4. The device of claim 3, wherein the rods pass through the upper channel, and the springs are disposed on said rods only between the upper channel and the lower channel to urge said two channels apart.

5. The device of claim 1, wherein the two crossed arms are pivoted on a central axis and nest one within the other, each of said arms having a large central opening, both of which are aligned, said combined center opening receiving a tubular guide which guide can vary in opening to accommodate different diameter drill bits.

6. The device of claim 1 wherein the threaded means is a bolt that has a hand tightenable head thereon, and which bolt threadedly engages the bar and impacts the upper channel to move said upper channel.

7. The device of claim 1 further including a retainer, mountable to said upper channel and adapted to receive a measuring bar for the disposition of a plurality of said devices in a row on said measuring bar.

8. The device of claim 7, wherein said retainer has an opening for the receipt of said tubular guide and includes means for attachment thereto.

9. The device of claim 7 further including a measuring bar having measurement indicia thereon to aid in the spacing of the aligned mounting of a plurality of said devices.

10. The device of claim 9 wherein the measuring bar is mounted to the retainer by a set of thumb screws.

11. The device of claim 1 further including a notch bar for disposition between the locator pins, said notch bar having a notch at each end and a racetrack shaped central opening for alignment with the tubular guide, said notch bar being for drawing a series of dots or a line on the item to be drilled to ensure the dots are linearly aligned.

12. A self centering drilling jig comprising:
    a) a frame having a pair of mirror image opposed equal extension U-shaped channels, an upper channel and a lower channel, which channels define a spaced pair of parallel tracks, and a bar spaced away from said upper arm and parallel thereto;
    b) a single cross having two crossed arms, each arm having two ends, the respective ends of said crossed arms each sliding within the confines of one of the two channels, and movable along said channels between an inward position wherein the ends of one arm are closer to the ends of the other arm, and an outward position wherein the ends of the one arm are further apart from the ends of the other arm, the positioning of the two arms being dependent on the spacing between the two channels;
    c) a spring means connected to said cross to urge said cross into the outward position;
    d) threaded means disposed in said bar and impacting said upper channel for biasing said channels toward each other in opposition to said spring means, to thereby position the ends of said arms in a desired location;
    e) a single locator pin mounted near each end of each of said arms, and disposed outwardly from one side of said cross, each pin being equidistant from the center of said cross, and being adapted to retain the upper and lower faces of an elongated object to be drilled, between the four locator pins;
    f) a pair of spring carrying rods connecting said bar and said lower channel wherein the rods pass through the upper channel, and the springs are disposed on said rods only between the upper channel and the lower channel to urge said two channels apart.

13. A self centering drilling jig comprising:
    a) a frame having a pair of mirror image opposed U-shaped channels, an upper channel and a lower channel, which channels define a spaced pair of parallel tracks, and a bar spaced away from said upper arm;
    b) a single cross having two crossed arms, each arm having two ends, the respective ends of said crossed arms each sliding within the confines of one of the two channels, and movable along said channels between an inward position wherein the ends of one arm are closer to the ends of the other arm, and an outward position wherein the ends of the one arm are further apart from the ends of the other arm, the positioning of the two arms being dependent on the spacing between the two channels, wherein the two crossed arms are pivoted on a central axis and nest one within the other, each of said arms having a large central opening, both of which are aligned, said combined center opening receiving a tubular guide which guide can vary in opening to accommodate different diameter drill bits;
    c) a spring means connected to said cross to urge said cross into the outward position;
    d) threaded means disposed in said bar and impacting said upper channel for biasing said channels toward each other in opposition to said spring means, to thereby position the ends of said arms in a desired location;
    e) a single locator pin mounted near each end of each of said arms, and disposed outwardly from one side of said cross, each pin being equidistant from the center of said cross, and being adapted to retain the upper and lower faces of an elongated object to be drilled, between the four locator pins; and
    f) further including a retainer, mountable to said upper channel and adapted to receive a measuring bar for the disposition of a plurality of said devices in a row on said measuring bar, and wherein said retainer has an opening for the receipt of said tubular guide and includes means for attachment thereto.

14. The device of claim 13, further including a measuring bar having measurement indicia thereon to aid in the spacing of the aligned mounting of a plurality of said devices and wherein the measuring bar is mounted to the retainer by a set of thumb screws.

15. The device of claim 14 further including a notch bar for disposition between the locator pins, said notch bar having a notch at each end and a racetrack shaped central opening for alignment with the tubular guide, said notch bar being for drawing a series of dots or a line on the item to be drilled to ensure the dots are linearly aligned.

\* \* \* \* \*